(12) United States Patent
Bredenberg et al.

(10) Patent No.: US 11,686,931 B2
(45) Date of Patent: Jun. 27, 2023

(54) THREE-DIMENSIONAL VIEWING DEVICE

(71) Applicant: World Precision Instruments, Sarasota, FL (US)

(72) Inventors: Clifford Bredenberg, Sarasota, FL (US); Cory Boyes, Sarasota, FL (US); Chris Hatcher, Sarasota, FL (US)

(73) Assignee: World Precision Instruments, Sarasota, FL (US)

( * ) Notice: Subject to any disclaimer, the term of this patent is extended or adjusted under 35 U.S.C. 154(b) by 133 days.

(21) Appl. No.: 17/219,953

(22) Filed: Apr. 1, 2021

(65) Prior Publication Data

US 2022/0317430 A1   Oct. 6, 2022

(51) Int. Cl.
*G02B 21/22* (2006.01)
*H04N 13/239* (2018.01)
*G02B 21/24* (2006.01)
*G02B 30/36* (2020.01)
*G02B 21/36* (2006.01)
*G02B 21/02* (2006.01)
*H04N 23/69* (2023.01)

(52) U.S. Cl.
CPC ........... *G02B 21/22* (2013.01); *G02B 21/025* (2013.01); *G02B 21/241* (2013.01); *G02B 21/36* (2013.01); *G02B 30/36* (2020.01); *H04N 13/239* (2018.05); *H04N 23/69* (2023.01)

(58) Field of Classification Search
CPC .... G02B 21/22; G02B 21/025; G02B 21/241; G02B 21/36; G02B 30/36; H04N 13/239; H04N 5/23296
USPC .......................................................... 348/47
See application file for complete search history.

(56) References Cited

U.S. PATENT DOCUMENTS

2005/0219685 A1*  10/2005  Swift ................. G02B 21/0008
                                                      359/368
2018/0008140 A1*   1/2018  Izatt ..................... H04N 13/344

* cited by examiner

*Primary Examiner* — Allen C Wong
(74) *Attorney, Agent, or Firm* — Hovey Williams LLP

(57) ABSTRACT

A three-dimensional viewing includes a pair of digital image sensors in communication with a pair of digital displays and controlled by a pair of processors to render three-dimensional images of samples on the displays.

10 Claims, 6 Drawing Sheets

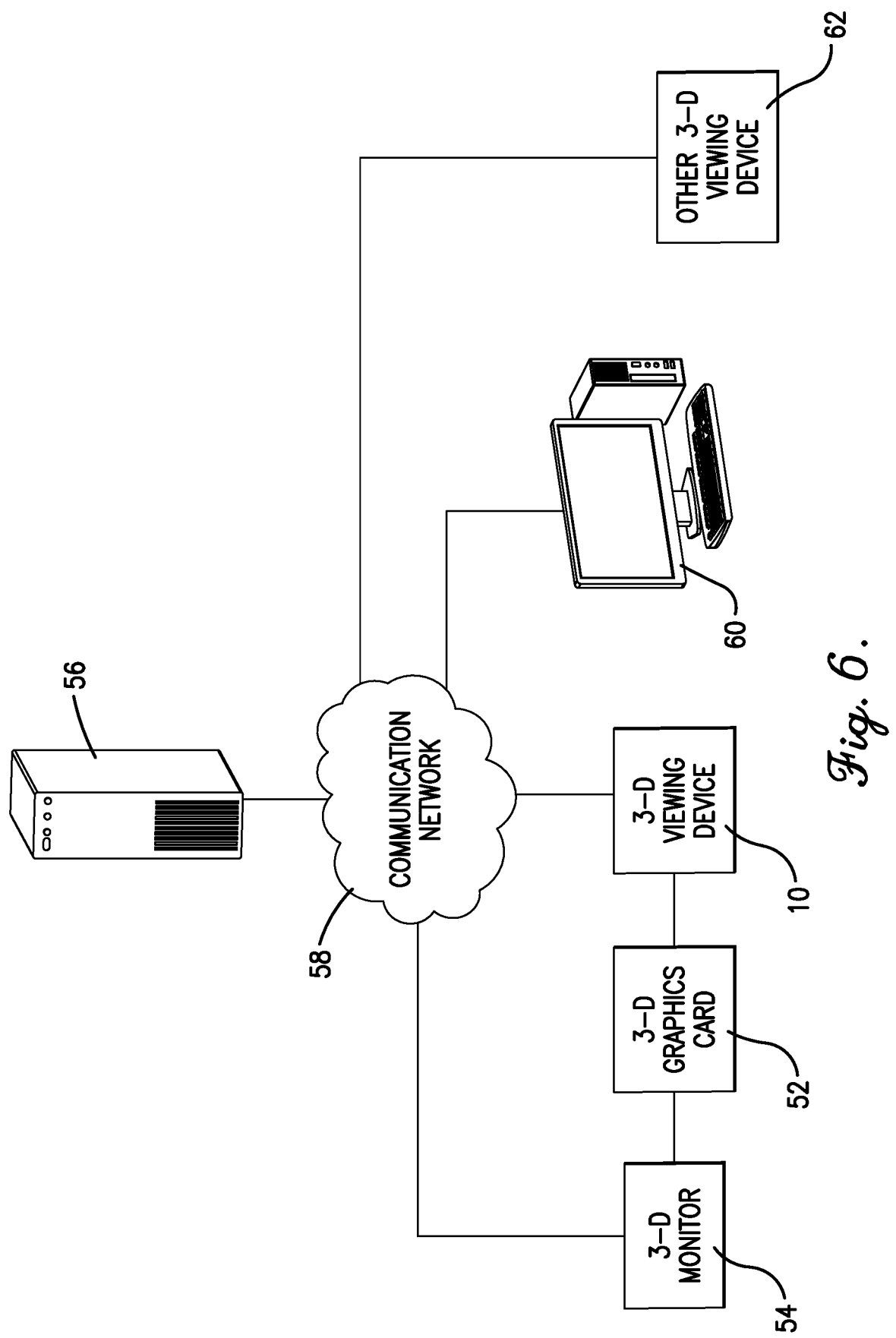

THREE-DIMENSIONAL VIEWING DEVICE

BACKGROUND

The present invention relates to stereo microscopes and other three-dimensional viewing devices.

Stereo microscopes, also often referred to as stereoscopes, are often used to study the surfaces of solid specimens and/or to carry out detailed work such as dissection, watchmaking, forensic studies, etc. Stereoscopes employ a dual optical path to present two views of a specimen, each view from a slightly different perspective. Resulting images are presented to separate ocular assemblies that focus each of a user's eyes on a different display. The human brain integrates these two images into a real time three-dimensional representation of the specimen.

Known stereoscopes utilize a variety of optical elements that require mechanical movements to change viewing conditions, such as for example, focusing, zooming, and navigating a field of view. Focusing and adjusting these optical elements is often time consuming and inaccurate. Many stereoscopes are also too expensive for practical use in many applications. Known stereoscopes also lack convenient ways to view and share three-dimensional images with others.

SUMMARY

The present invention solves the above-described problems and other related problems by providing a three-dimensional viewing device that is easier to use and less costly to manufacture and that enables multiple methods of viewing and/or sharing three-dimensional images.

An exemplary embodiment of the viewing device comprises a specimen platform for holding a specimen to be viewed; a support positioned above the specimen platform; and a viewing head attached to the support that allows a user to view a magnified three-dimensional representation of the specimen.

An embodiment of the viewing head comprises two image collection assemblies that each independently render a magnified representation of a specimen from a different perspective. A user my simultaneously view the specimen through the image collection assemblies to see a magnified three-dimensional representation of the specimen. The viewing device may also export a three-dimensional representation of the specimen for display on an external display and/or upload image data to a cloud computing network for viewing by remote computers.

Each image collection assembly comprises a digital image sensor, an optical zoom assembly mounted between the digital image sensor and the specimen, a processor for receiving image signals from the image sensor, a digital display coupled with the processor for rendering a magnified representation of the specimen, and an eyepiece lens through which a user may view the representation on the display.

Each processor receives image signals from its image sensor and renders a representation of the specimen on its display. In some embodiments, the viewing device also comprises an integral audio recognition chip in communication with one of both the processors to receive voice commands from a user for the processors to interpret and communicate to the image sensors and displays.

In accordance with an important aspect of the present invention, one of the processors may simultaneously adjust the zoom and focus of the viewing device. For this purpose, the viewing head includes a rotatable knob or other input mechanism that may be incrementally rotated or otherwise manipulated. When operated, the input mechanism provides a signal to at least one of the processors, which in turn signals the optical zoom assemblies to adjust their zoom. The processor simultaneously accesses a look-up table to determine the appropriate amount of focus adjustment needed for the adjusted zoom and sends corresponding signals to the image sensors to adjust their lenses to achieve the prescribed focus adjustment. For example, in one embodiment, the optical zoom assemblies each include lenses with 1×-6× magnification. A rotatable knob with 6 increments may be manipulated to adjust the magnification, with each incremental rotation of the knob signaling the processor to increase the zoom of the optical zoom assemblies by 1×. While the processor adjusts the zoom, it simultaneously adjusts the focus of the image sensors an amount corresponding to the adjusted zoom.

In one embodiment, the degree of focus adjustment is determined with a look-up table accessible by the processor. The look-up table indicates the amount of focus adjustment required for each incremental amount of zoom adjustment. Thus, each incremental rotation of the knob signals the processor to increase the zoom of the optical zoom assemblies by 1× and to look up and implement the appropriate focus adjustment for the selected zoom. Simultaneously adjusting the zoom and focus in this manner is faster and often more accurate than prior art methods of adjusting stereoscopes and provides a more convenient and useful three-dimensional viewing experience.

Importantly, the image sensors and processors allow panning up, down, left, and/or right without moving the specimen.

The viewing head may also comprise a focal point adjustment mechanism for adjusting the focal point of the image sensors to accommodate working distance changes as the viewing head is moved up or down on the support relative to the specimen platform. In one embodiment, the focal point adjustment mechanism includes moveable plates on which the image sensors are mounted, adjustment mechanism coupled with the plates, and an adjustment knob for operating the adjustment mechanism. The adjustment knob may be rotated in one direction to increase the spacing of the image sensors and the opposite direction to decrease the spacing.

The viewing device may also include or be coupled with a 3-D graphics card for rendering a magnified three-dimensional representation of the specimen on an external 3-D monitor. In other embodiments, the viewing device may upload the image signals from the digital image sensors to an external cloud-computing network or other computer network that processes the image signals into a magnified three-dimensional representation of the specimen. The network may be accessible via the Internet or other communications network so anyone with a 3-D monitor may view the magnified three-dimensional representation of the specimen from anywhere. In other embodiment, images may be stored on removable memory cards that may be transferred to remote computers for viewing. In still other embodiment, image data may be transmitted wirelessly from the viewing device to remote computers for viewing. Providing all of these ways to view and share three-dimensional images also provides a more convenient and useful three-dimensional viewing experience.

This summary is provided to introduce a selection of concepts in a simplified form that are further described in the detailed description below. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

BRIEF DESCRIPTION OF THE DRAWING FIGURES

Embodiments of the present invention are described in detail below with reference to the attached drawing figures, wherein:

FIG. 6 is a schematic representation of the viewing device along with other equipment that may be directly or indirectly in communication with the viewing device.

Figure 1:
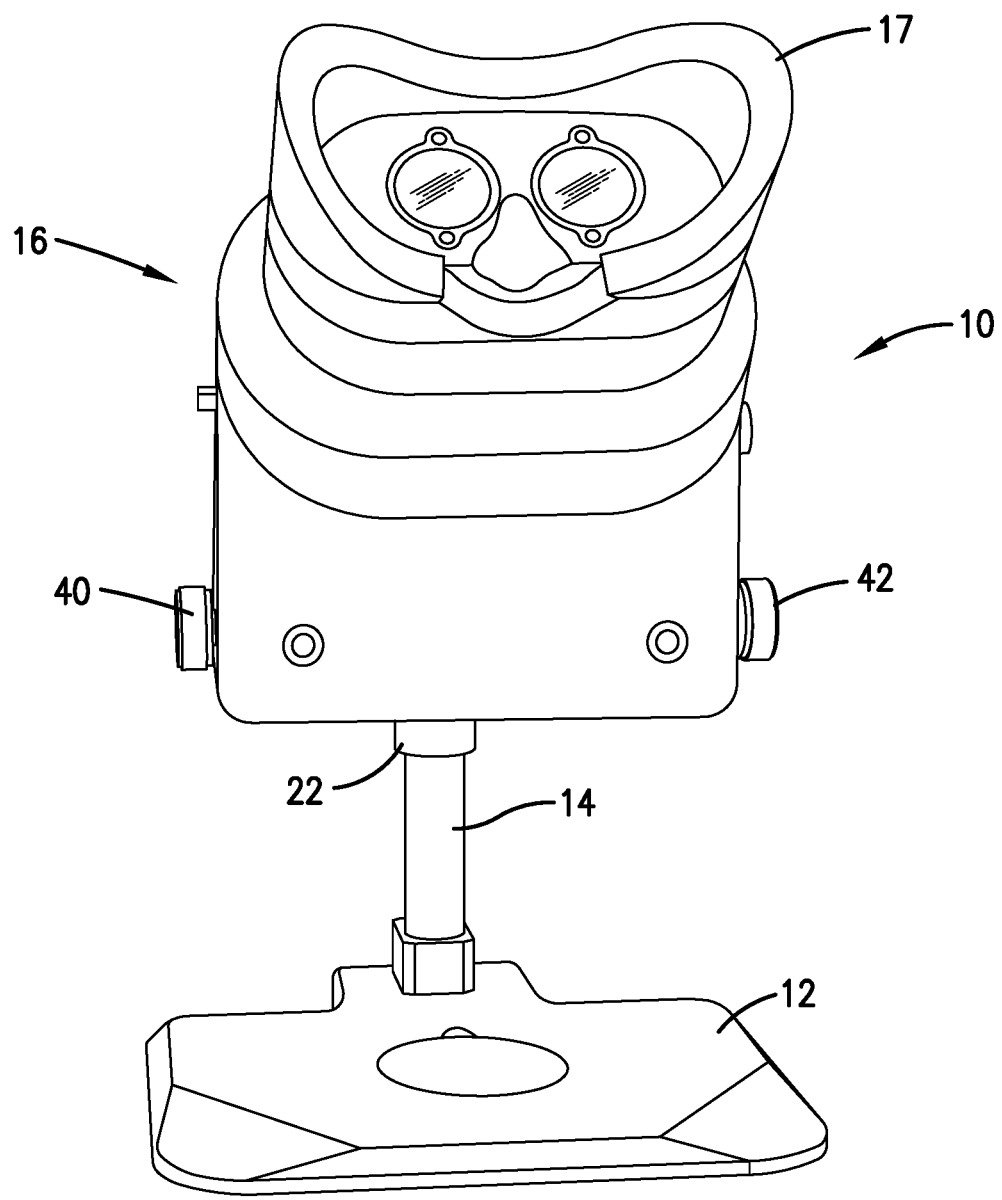
FIG. 1 is a front elevational view of a three-dimensional viewing device constructed in accordance with embodiments of the invention.

The drawing figures do not limit the present invention to the specific embodiments disclosed and described herein. The drawings are not necessarily to scale, emphasis instead being placed upon clearly illustrating the principles of the invention.

DETAILED DESCRIPTION

The present invention provides a three-dimensional viewing device for viewing specimens and rendering magnified three-dimensional representations of the specimens. The viewing device broadly comprises a pair of digital image sensors in communication with a pair of digital displays and controlled by a pair of processors to render three-dimensional images of specimens on the displays in real-time.

Figure 2:
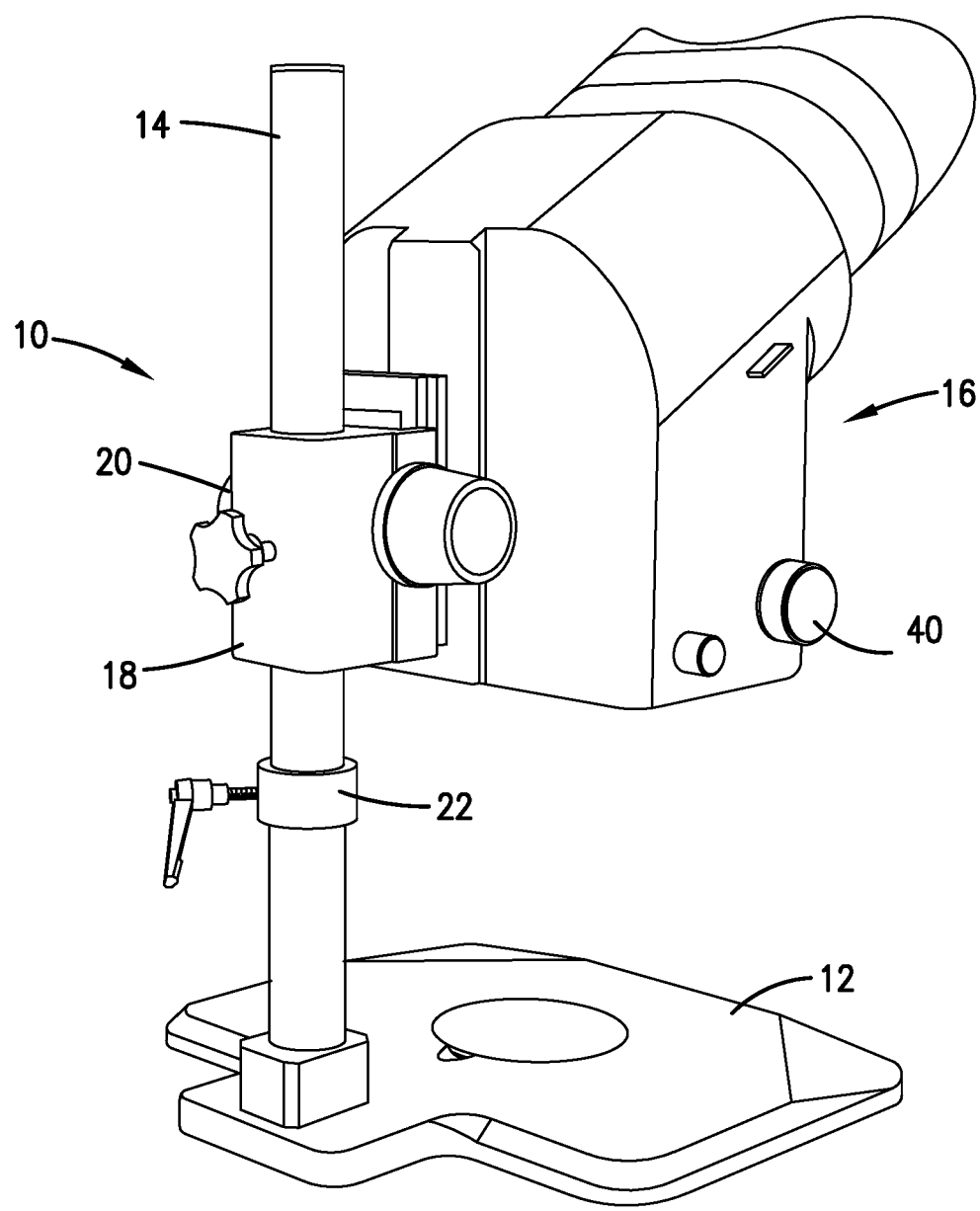
FIG. 2 is a rear perspective view of the viewing device.
Figure 3:
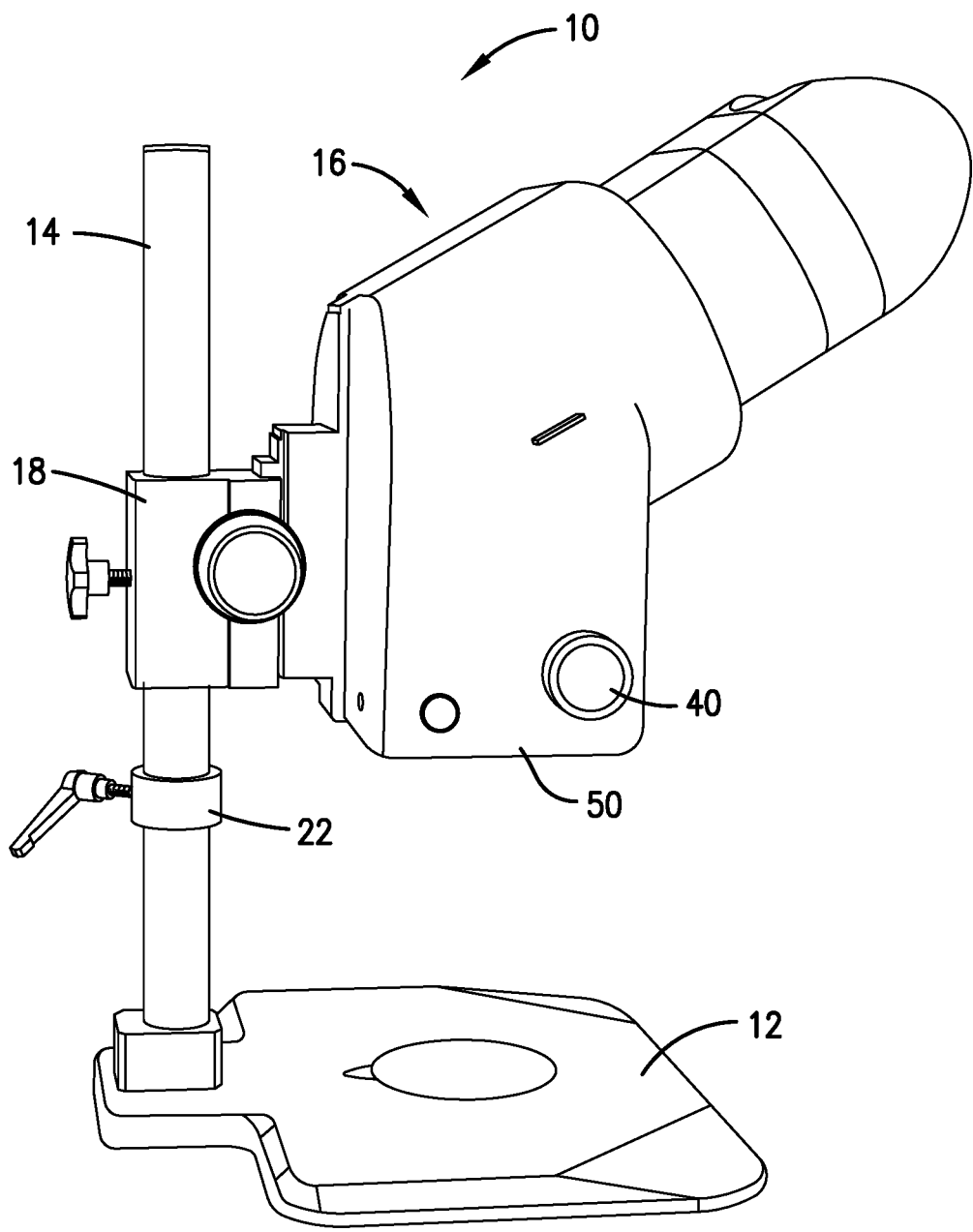
FIG. 3 is a left side view of the viewing device.

Exemplary embodiments of the viewing device are shown in the drawing figures. Turning first to FIGS. 1-3, a viewing device 10 constructed in accordance with one embodiment of the invention comprises a specimen platform 12 for holding a specimen; a support 14 extending above the specimen platform; and a viewing head 16 attached to the support above the specimen platform for viewing the specimen and rendering a magnified three-dimensional representation of the specimen.

The specimen platform 12 may be any surface on which a specimen may be placed and may be any shape and size and be made of any materials such as plastic, metal, or composite materials. In one embodiment, the specimen platform also serves as a base from which the support extends.

The support 14 may be any device that can support the viewing head 16 above the specimen platform 12. For example, the support 14 may be a support arm, a self-supported table-top stand, a wall-mounted stand, an articulating arm, a surgical stand, a universal mount, etc. In the illustrated embodiment, the support 14 is a 30 mm metal rod or post with its lower end secured to the specimen platform 12.

The viewing head 16 is attached to the support 14 above the specimen platform 12 so that a user may look into it to view an image of the specimen. The viewing head 16 may be moved up and down relative to the specimen platform 12 to adjust the working distance of the viewing device. In one embodiment, the viewing head is movably mounted to the support by a rack and pinion mechanism 18 controlled by a track knob 20. The track knob 20 may be rotated in one direction to lower the viewing head relative to the specimen platform and rotated in the opposite direction to raise the viewing head relative to the specimen platform. An adjustable and lockable safety collar 22 may be placed on the support below the viewing head to limit the downward travel of the viewing head.

Figure 5:
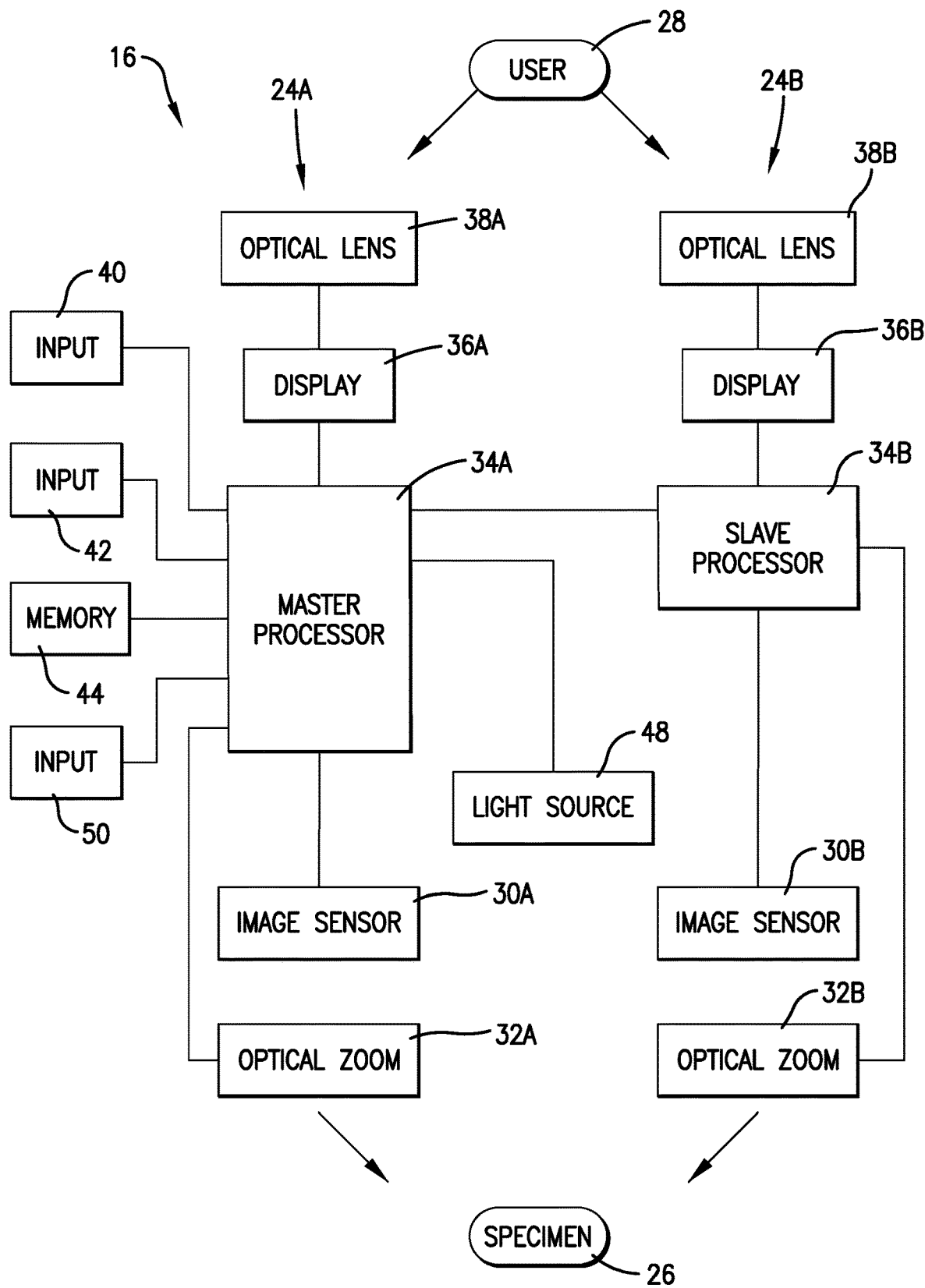
FIG. 5 is a schematic representation of components of the viewing device.

Components of an exemplary viewing head 16 are shown schematically in FIG. 5 and comprise two image collection assemblies 24A and 24B that each independently render a magnified representation of a specimen 26 from a different perspective. A user 28 may simultaneously view the specimen 26 through the image collection assemblies 24A, 24B to see a magnified three-dimensional representation of the specimen. As described below, a three-dimensional representation of the specimen may also be displayed on an external display and/or be accessed by remote computers.

Each image collection assembly 24A, 24B comprises a digital image sensor 30A, 30B, an optical zoom assembly 32A, 32B mounted between its digital image sensor and the specimen, a processor 34A, 34B for receiving image signals from its image sensor, a digital display 36A, 36B coupled with its processor for rendering a magnified representation of the specimen, and an eyepiece lens 38A, 38B through which a user may view the representation on the displays.

The image sensors 30A, 30B may be CMOS sensors or any other devices capable of creating digital images of specimens. In one particular embodiment, the image sensors 30A, 30B are 5 Mega-pixel high resolution digital cameras. Use of two digital cameras or other digital image sensors communicating images to two displays provides smoother changes in magnification and other optical transitions. Additionally, since images are digitally acquired in real time via the digital cameras, they can be preprocessed in a variety of ways such as to provide contrast and image enhancement not possible with traditional optics alone.

In one embodiment, the optical zoom assemblies 32A, 32B are optical lenses that each provide 6× magnification. The optical zoom assemblies may also provide other levels of magnification.

Each processor 34A, 34B receives image signals from its image sensor and renders a representation of the specimen on its display. One of the processors 34A may control some functions of the other processor 34B, so the processors are labeled as Master and Slave. In some embodiments, the viewing device 10 only includes one processor. In other embodiments, the viewing device 10 may include no processor, but instead may send the image signals to a remote computing device for rendering into three-dimensional images.

Importantly, the image sensors and processors allow panning up, down, left, and/or right without moving the specimen. The processors are configured to initially capture the pixels of the center most areas of the sensors. In one embodiment, the processors capture approximately 33% of the image sensor pixels and display this 33% as an entire image in the displays. However, the image sensors create image signals for 100% of the specimen. This allows digital panning of the specimen without moving the specimen. Additionally, coordinates for viewed portions of the specimen may be saved, and the processor can automatically return to these coordinates when instructed. Thus, the processors in coordination with the image sensors can digitally zoom into images of specimens and the zoom can be panned across an entire image to effectively increase the field of view of the viewing device.

The digital displays may be liquid crystal displays (LCDs), miniature OLED displays, or any other digital displays. Each digital display 36A, 36B is coupled with one processor for receiving image signals from the processor. When a user 28 views both displays, the user integrates the two images into a real time three-dimensional representation of the specimen. Thus, the two displays together render a magnified representation of the specimen.

The eyepiece lenses 38A, 38B allow the user 28 to simultaneously view the displays 36A, 36B of both image collection assemblies to see a magnified three-dimensional representation of the specimen. In some embodiments, the eyepiece lenses provide further magnification. As best shown in FIG. 1, the eyepiece lenses are mounted within a flexible interface 17 in the shape of goggles so the user may place his or her face against the interface 17 to comfortably view the displays. The lenses 38A, 38B and their respective displays may be laterally moveable relative to one another within the interface by pupillary adjustment mechanism to accommodate users with different eye spacings. One eyepiece lens and display pair, preferably the right pair, are mounted to a support that may be moved toward or away from the other stationary lens/display pair to adjust the distance between the eyepiece lenses and displays. The adjustable lens/display pair may be moved with a slider switch or other mechanism.

In some embodiments, the viewing device 10 also comprises an integral audio recognition chip in communication with one or both the processors to receive voice commands from a user for the processors to interpret and communicate to the image sensors and displays. At least one of the processors is configured to process command inputs from a user and communicate with the image sensors and displays to execute the commands accordingly. Commands may include, without limitation:
  recording snapshots or movie clips in real time;
  selecting and navigating to specific regions of the display;
  zooming in or out;
  changing the focus plane;
  panning the full or expanded image in different two-dimensional directions; changing contrast or color balance;
  changing the intensity of the physical illumination of the specimen;
  comparing a currently displayed image to another image, in any manner, by pixel or by mathematical algorithm; and
  applying an optical or digital filter, such as a Bayer Pattern, to either the displayed or retrieved image.

While the viewing device recognizes and executes voice commands, the rotary knobs and other input mechanisms described herein are the primary ways to control the viewing device.

In accordance with an important aspect of the present invention, the viewing device 10 also includes improved zoom and focus adjustment mechanisms. In one embodiment, the master processor 34A is configured to simultaneously adjust the magnification or zoom of the optical zoom assemblies 32A, 32B and the focus of the image sensors 30A, 30B. To this end, the viewing device includes a rotatable knob 40 or other input mechanism that may be incrementally rotated or otherwise manipulated to provide a signal to the processor, which in turn signals the optical zoom assemblies to adjust their zoom. The processor 34A simultaneously accesses a look-up table to determine the appropriate amount of focus adjustment needed for the change in zoom and sends corresponding signals to the image sensors 30A, 30B to adjust their lenses to achieve the prescribed focus adjustment.

For example, in one embodiment, the optical zoom assemblies 32A, 32B each include lenses with magnification from 1×-6×. In this embodiment, the input mechanism 40 is a rotatable knob with 6 increments. Each incremental rotation of the knob signals the processor 34A to increase the zoom of the optical zoom assemblies by 1×. While the processors adjust the zoom, the processor 34A simultaneously determines the proper amount of focus adjustment for the selected zoom. In one embodiment, the degree of focus adjustment is provided by a look-up table accessible by the processor 34A. The look-up table indicates the amount of focus adjustment required for each incremental amount of zoom adjustment. Thus, each incremental rotation of the knob 40 signals the processors to increase the zoom of the optical zoom assemblies by 1× and focuses the image sensors to accommodate the zoom. Simultaneously adjusting the zoom and focus in this manner is faster and often more accurate than prior art methods of adjusting stereoscopes and provides a more convenient and useful three-dimensional viewing experience.

This same knob 40 or another input mechanism may be used to control functions of the viewing device. In one embodiment, the button may be pressed once to display a menu on one or both displays. The knob may then be rotated to scroll between menu items to select and perform any of the commands described above.

An embodiment of the viewing device also includes a knob 42 or other input mechanism for triggering the capture and storage of images and videos. The knob 42 may be pressed and released to capture a still image and store it in memory 44 and pressed and held to capture a video image, which is then stored in the memory when the knob is released.

The viewing device may also comprise focal point adjustment mechanism for adjusting the focal point of the image sensors to accommodate working distance changes as the viewing head is moved up or down on the support relative to the specimen platform. In one embodiment, the image sensors are mounted on plates that may be moved toward or away from one another by an adjustment mechanism. The adjustment mechanism includes or is coupled to an adjustment knob 46 that may be rotated one direction to increase the spacing of the image sensors and the opposite direction to increase the spacing.

Figure 4:
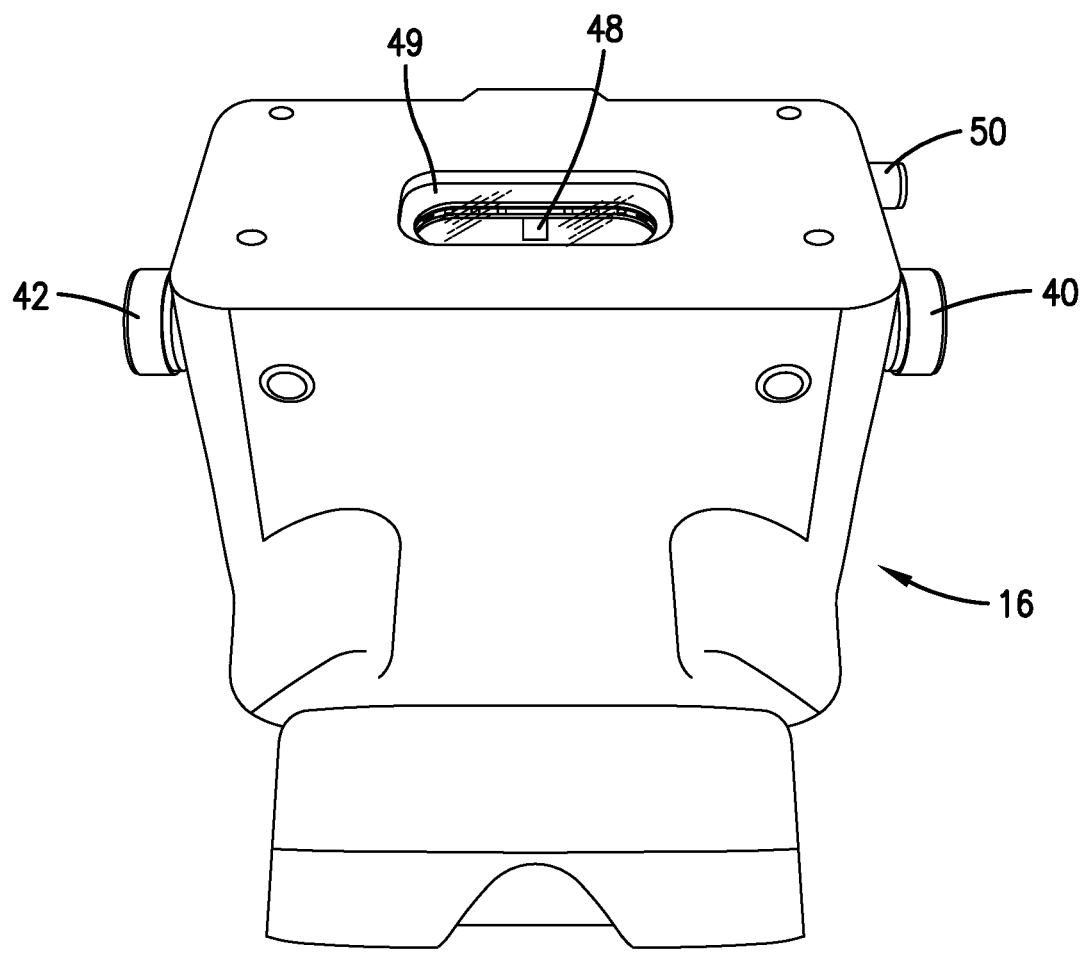
FIG. 4 is a bottom view of the viewing head portion of the viewing device.

The viewing head also comprises a light source 48, such as an LED, aimed at the specimen platform and a knob 50 or other input mechanism for adjusting the light output of the light source. The light source 48 and the optical zoom assemblies 32A, 32B may be behind a glass window 49 positioned on the lower end of the viewing head 16 as shown in FIG. 4. The light source may emit a light with variable wavelengths to facilitate viewing of specimens exhibiting fluorescence.

As shown in FIG. 6, the viewing device 10 may also include or be coupled with a 3-D graphics card 52 for rendering a magnified three-dimensional representation of the specimen on an external 3-D monitor 54. In other embodiments, the viewing device may upload the image signals from the digital image sensors to an external cloud-computing network 56 or other computer network that processes the image signals into a magnified three-dimensional representation of the specimen. The network may be accessible via the Internet or other communications network 58 so anyone with a computer 60, other viewing device 62, or 3-D monitor may view the magnified three-dimensional representation of the specimen from anywhere. In other embodiment, images may be stored on removable memory cards that may be transferred to remote computers for viewing. In still other embodiment, image data may be transmitted wirelessly from the viewing device to remote computers for viewing. Providing all of these ways to view and share three-dimensional images provides a more convenient and useful three-dimensional viewing experience.

Additional Considerations

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments but is not necessarily included. Thus, the current technology can include a variety of combinations and/or integrations of the embodiments described herein.

Although the present application sets forth a detailed description of numerous different embodiments, the legal scope of the description is defined by the words of the claims set forth at the end of this patent and equivalents. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims.

The above description of embodiments of the invention references the accompanying drawings. The embodiments are intended to describe aspects of the invention in sufficient detail to enable those skilled in the art to practice the invention. Other embodiments can be utilized and changes can be made without departing from the scope of the claims. The following detailed description is, therefore, not to be taken in a limiting sense. The scope of the present invention is defined only by the appended claims, along with the full scope of equivalents to which such claims are entitled.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as computer hardware that operates to perform certain operations as described herein.

In various embodiments, computer hardware, such as the processors 34A, 34B, may be implemented as special purpose or as general purpose. For example, the processors may comprise dedicated circuitry or logic that is permanently configured, such as an application-specific integrated circuit (ASIC), or indefinitely configured, such as an FPGA, to perform certain operations. The processors may also comprise programmable logic or circuitry (e.g., as encompassed within a general-purpose processor or other programmable processor) that is temporarily configured by software to perform certain operations. It will be appreciated that the decision to implement the processing element as special purpose, in dedicated and permanently configured circuitry, or as general purpose (e.g., configured by software) may be driven by cost and time considerations.

Accordingly, the terms "processor", "processing element", or equivalents should be understood to encompass a tangible entity, be that an entity that is physically constructed, permanently configured (e.g., hardwired), or temporarily configured (e.g., programmed) to operate in a certain manner or to perform certain operations described herein. Considering embodiments in which the processing element is temporarily configured (e.g., programmed), each of the processing elements need not be configured or instantiated at any one instance in time. For example, where the processing element comprises a general-purpose processor configured using software, the general-purpose processor may be configured as respective different processing elements at different times. Software may accordingly configure the processing element to constitute a hardware configuration at one instance of time and to constitute a different hardware configuration at a different instance of time.

Computer hardware components, such as communication elements, memory elements, processing elements, and the like, may provide information to, and receive information from, other computer hardware components. Accordingly, the described computer hardware components may be regarded as being communicatively coupled. Where multiple of such computer hardware components exist contemporaneously, communications may be achieved through signal transmission (e.g., over appropriate circuits and buses) that connect the computer hardware components. In embodiments in which multiple computer hardware components are configured or instantiated at different times, communications between such computer hardware components may be achieved, for example, through the storage and retrieval of information in memory structures to which the multiple computer hardware components have access. For example, one computer hardware component may perform an operation and store the output of that operation in a memory device to which it is communicatively coupled. A further computer hardware component may then, later, access the memory device to retrieve and process the stored output. Computer hardware components may also initiate communications with input or output devices, and may operate on a resource (e.g., a collection of information).

The various operations of example methods described herein may be performed, at least partially, by processors that are temporarily configured (e.g., by software) or permanently configured to perform the relevant operations. Whether temporarily or permanently configured, such processing elements may constitute processing element-implemented modules that operate to perform one or more operations or functions. The modules referred to herein may, in some example embodiments, comprise processing element-implemented modules.

Similarly, the methods or routines described herein may be at least partially processing element-implemented. For example, at least some of the operations of a method may be performed by one or more processing elements or processing element-implemented hardware modules. The performance of certain of the operations may be distributed among the one or more processing elements, not only residing within a single machine, but deployed across a number of machines. In some example embodiments, the processing elements may be located in a single location (e.g., within a home environment, an office environment or as a server farm), while in other embodiments the processing elements may be distributed across a number of locations.

Unless specifically stated otherwise, discussions herein using words such as "processing," "computing," "calculating," "determining," "presenting," "displaying," or the like may refer to actions or processes of a machine (e.g., a computer with a processing element and other computer hardware components) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

The patent claims at the end of this patent application are not intended to be construed under 35 U.S.C. § 112(f) unless traditional means-plus-function language is expressly recited, such as "means for" or "step for" language being explicitly recited in the claim(s).

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. A three-dimensional viewing device for viewing a specimen, the viewing device comprising:
    a specimen platform for holding the specimen;
    a support above the specimen platform; and
    a viewing head attached to the support above the specimen platform for viewing the specimen on the platform, the viewing head comprising two image collection assemblies that each independently render a magnified representation of the specimen from a different perspective to create a magnified three-dimensional representation of the specimen;
    wherein each image collection assembly comprises:
        an optical zoom lens for magnifying the specimen;
        a digital camera configured to view a portion of the specimen through the optical zoom lens and from a unique perspective to create a magnified image of the specimen;
        a digital display configured to display the magnified image from the digital camera;
            a processor in communication with the digital camera and the digital display to transmit the magnified image to the digital display; wherein one of processors of the image collection assemblies is a master processor and is configured to simultaneously adjust a zoom of the optical zoom lens and a focus of the digital camera.

2. The three-dimensional viewing device of claim 1, each image collection assembly further comprising an eyepiece lens.

3. The three-dimensional viewing device of claim 1, further comprising a light source for illuminating the specimen.

4. The three-dimensional viewing device of claim 1, further comprising a rotatable knob that is incrementally rotated to signal the master processor to simultaneously adjust the zoom of the optical zoom lens and the focus of the digital camera of both image collection assemblies.

5. The three-dimensional viewing device of claim 4, wherein the master processor adjusts the zoom in accordance with a degree of rotation of the rotatable knob and accesses a look-up table to adjust the focus of the digital cameras.

6. The three-dimensional viewing device of claim 5, wherein the optical zoom lens of each image collection assembly provides multiple levels of magnification.

7. The three-dimensional viewing device of claim 6, wherein the rotatable knob can be incrementally rotated to multiple positions, with each incremental rotation of the knob signaling the master processor to increase the zoom of the optical zoom lenses by 1X.

8. The three-dimensional viewing device of claim 1, further comprising focal point adjustment mechanism for adjusting a focal point of the digital cameras to accommodate working distance changes as the viewing head is moved up or down on the support relative to the specimen platform.

9. The three-dimensional viewing device of claim 8, wherein the focal point adjustment mechanism comprises plates on which the digital cameras are mounted, an adjustment mechanism coupled with the plates, and an adjustment knob coupled with the adjustment mechanism, wherein the adjustment knob is rotated in one direction to increase a spacing of the image sensors and an opposite direction to decrease the spacing.

10. The three-dimensional viewing device of claim 1, further comprising a 3-D graphics card coupled with the master processor for rendering a magnified three-dimensional representation of the specimen on an external 3-D monitor.

* * * * *